United States Patent [19]

Suzuki

[11] Patent Number: 5,157,649
[45] Date of Patent: Oct. 20, 1992

[54] OPTICAL PICKUP DEVICE FOR OPTICAL RECORDING/PLAYBACK APPARATUS

[75] Inventor: Masayuki Suzuki, Yokohama, Japan

[73] Assignee: Victor Company of Japan, Ltd., Yokohama, Japan

[21] Appl. No.: 540,007

[22] Filed: Jun. 19, 1990

[30] Foreign Application Priority Data

Jun. 19, 1989 [JP] Japan .................................. 1-156268

[51] Int. Cl.$^5$ .............................................. G11B 7/00
[52] U.S. Cl. ..................................... 369/110; 369/112
[58] Field of Search .................. 369/112, 44.23, 44.11, 369/32, 46.24, 109, 13, 110; 360/114; 365/122

[56] References Cited

U.S. PATENT DOCUMENTS

| | | | |
|---|---|---|---|
| 4,333,173 | 6/1982 | Yonezawa et al. | 369/44.23 |
| 4,779,250 | 10/1988 | Kogure et al. | 360/114 |
| 4,833,662 | 5/1989 | Yoda | 360/114 |
| 4,837,758 | 6/1989 | Motoyama et al. | 369/13 |
| 4,985,880 | 1/1991 | Yoshida et al. | 369/13 |

Primary Examiner—Roy N. Envall, Jr.
Assistant Examiner—Thang V. Tran
Attorney, Agent, or Firm—Fleit, Jacobson, Cohn, Price, Holman & Stern

[57] ABSTRACT

An optical pickup device used in an optomagnetic disk recording/playback apparatus, comprises a light emitting element such as a semiconductor laser for producing a light for recording information onto a recording medium and playing back the information from the medium; a parallel light generating element such as a collimator lens for changing the light from the light emitting element to a parallel light; a beam shaping element for shaping the parallel light into a substantially circular shape in cross section; a beam splitter for dividing the circular beam from the beam shaping element; a light beam receiving element for receiving a divided beam reflected on a splitting plane of the beam splitter; and a polarized plane change element such as half-wave plate provided at a predetermined position of an optical system between the light emitting element and the beam splitter, for changing a plane of polarization of light passing through by a predetermined angle.

7 Claims, 8 Drawing Sheets

OPTICAL PICKUP DEVICE FOR OPTICAL RECORDING/PLAYBACK APPARATUS

BACKGROUND OF THE INVENTION

The present invention relates to an optical pickup device for an optical magnetic recording/playback apparatus, and more particularly to an optical pickup device adapted to irradiate a laser beam to a recording medium such as an optical disk, etc. to record information onto the magnetic medium, or to play back or reproduce the information therefrom.

Generally, since the signal detection optical system of an optical pickup for an optical magnetic recording/playback apparatus is complicated, the weight of the entirety of the pickup is increased, resulting in a major problem in realizing a high speed access. As the means for solving this problem, there is known a separation type optical system such that only an objective lens of an optical pickup, an actuator unit for driving the lens, and a beam directing prism are mounted on a feed mechanism for directing the laser beam to the lens, to thus construct a movable unit transferred in a radial direction of the disk, and that other portions of the optical pickup are fixed to the base plate of the recording/playback apparatus to thereby reduce the weight of the movable unit to much degree, thus permitting an access time, a power dissipation in access, and the like to be lessened. FIG. 1 is a schematic view showing an example of such a separation type optical system. A laser beam 3 emitted from an optical pickup fixing unit 2 fixed to a base plate 1 of the apparatus is incident to an optical system movable unit 4 movable in a direction indicated by an arrow H. The direction of the incident beam is changed by a beam directing prism 7. The direction changed beam thus obtained is converged by an objective lens 5 controlled by an actuator 6, on a disk 8. Meanwhile, in such a separation type optical system, the transferring direction (feed direction) of the optical system movable unit must correspond exactly with the optical axis direction of the laser beam emitted from the optical system fixing unit. As a result, the optical path design of the optical pickup is considerably limited. FIG. 2 is a plan view showing the arrangement of an example of a pickup for an opto-magnetic disk employing such a separation type optical system. In FIG. 2, a laser beam emitted from a semiconductor laser 10 is, at the time of playback, subjected to high frequency modulation at a high frequency superposition circuit 11, and is changed to a parallel beam at a collimator lens 12. The parallel beam thus obtained is then incident to a beam shaping prism 13. Since the laser beam emitted from the semiconductor laser 10 is substantially elliptic in cross section, it is shaped by the prism 13 so that its cross section is substantially circular. A laser beam emitted from the prism 13 is incident to a beam directing prism 15 through a beam splitter 14, and is reflected thereat. The reflected beam is incident to an objective lens 16. The objective lens 16 focuses and irradiates the laser beam onto an opto-magnetic disk 17.

Hereinafter, the light polarized in a direction parallel with a p-plane which includes the normal to the splitting plane and an optical axis of incident light, is designated as "P-polarized light" and the light polarized in a perpendicular direction with the p-plane, is designated as "S-polarized light".

A reflected beam from the opto-magnetic disk 17 is incident to the beam splitter 14 through the objective lens 16 and the directing prism 15, and is reflected on the splitting plane 14a thereof. The reflected beam thus obtained travels toward a signal detection system (not shown). At this time, when attention is drawn to the splitting ratio on the splitting plane 14a of the beam splitter 14, since an emitted beam from the laser serves as a P-polarized light with respect to the splitting plane, the intensity of a reproduced or playback signal becomes maximum by allowing the ratio between a transmission factor $T_p$ of the P polarized light and reflection factor $R_p$ of P polarized light to be 67:33 and by allowing the ratio between transmission factor Ts of S polarized light and reflection factor Rs of S polarized light to be 0:100. When such an arrangement is employed, the optical axis 13A of a laser beam emitted from the prism 13 becomes in correspondence with the transferring direction V of the optical system movable unit. Thus, a separation type optical system can be constituted.

On the other hand, in the separation type optical system, the optical system fixing unit would protrude at least in one direction from a projected planform of the disk or a cartridge for sealing the disk therein as apparent from FIGS. 1 and 2 for reasons described below: (a) the movable unit and the fixing unit do not collide with each other even in the case where the movable unit is transferred to the outermost circumference of the disk, (b) adjustment of the optical system can be made even in a disk mounted state, and (c) as previously described, the transferring direction of the movable unit must correspond with the optical axis of the laser beam emitted from the optical system fixing unit. For example, in FIG. 2, the fixed unit 18 protrudes in a direction of the transferring direction V relative to the cartridge 19. Accordingly, as apparent from FIG. 2, in the case of an opto-magnetic disk drive apparatus using such a separation type optical system, the length of the optical system composed of the movable unit and fixing unit, in the transferring direction V of the movable unit cannot be shorter than a length obtained by adding a protrusion length L of the fixing unit to a diameter of the disk (or a length in the transferring direction V of the cartridge). On the other hand, the length of the drive unit in a direction W perpendicular to the transferring direction V cannot be less than the length in the direction W of the disk (cartridge). As stated above, there exist dimensional restrictions in the construction of the entirety of the apparatus.

FIG. 3 shows an optical system fixing unit of the same structure as that of FIG. 2. Furthermore, FIG. 4 shows an arrangement such that a laser beam emitted from the beam shaping prism 13 is incident to the beam splitter 14 from a direction normal to that of FIG. 3, and that a laser beam reflected on the splitting plane 14a of the beam splitter 14 is incident to the movable unit. In FIGS. 3 and 4, the same reference numerals are attached to portions corresponding to those of FIG. 2, respectively. An emitted beam which does not undergo beam shaping of existing high output semiconductor lasers is substantially elliptical in cross section, and the aspect ratio is about 3:1. Accordingly, for shaping this cross section to be substantially circular, it is desirable to set an incident angle $\theta_1$ to the prism and an incident angle $\theta_2$ to about 20 degrees and about 39 degrees, respectively.

When a comparison between arrangement of FIGS. 3 and 4 is made, an excessed length L of FIG. 4 in the movable unit transferring direction (indicated by an arrow V) can be clearly shorter than that of FIG. 3 in the same direction as described above.

On the other hand, a design may be made such that the minimum value in a direction normal to the transferring direction V of an opto-magnetic disk drive apparatus employing the above-mentioned optical system is limited by the length W of the cartridge, but is not dependent upon the length $W_1$ and $W_2$ of the fixing unit.

However, when an arrangement as shown in FIG. 4 is employed, the splitting ratio of the splitting plane 14a of the beam splitter 14 has a relationship opposite to that in the case of FIG. 3. Namely, the ratio between transmission factor Rp of P-polarized light is expressed as 33:67, and the ratio between transmission factor Ts of S-polarized light and reflection factor Rs of S-polarized light is expressed as 100:0. As a result, the reflection factor of P-polarized light with respect to the splitting plane 14a becomes higher than the reflection factor of S-polarized light with respect to the same.

As shown in FIG. 5, since the reflection factor of S-polarized light is higher than that of P-polarized light at all times independent of the incident angle, it is difficult to manufacture a beam splitter having such a splitting ratio.

In the case of recording information onto a direct read after write erasable optical disk, or erasing recorded information, an energy larger than that at the time of playback is required. To meet this, a high output semiconductor laser is used as a light source.

FIG. 6 is a plan view showing the arrangement of a different example of a conventional pickup device using a semiconductor laser.

In this figure, reference numeral 21 is a high output semiconductor laser for emitting a laser beam, and reference numeral 22 is a collimator lens for changing a laser beam emitted from the semiconductor laser 21 to a parallel beam. Furthermore, reference numeral 23 is a prism for shaping the cross section of a laser beam, and reference numeral 24 is a beam splitter having a splitting plane 24A.

Reference numeral 25 is a mirror to reflect a laser beam emitted from the beam splitter 24 in a direction perpendicular to the plane of the drawing to allow it to be incident to an objective lens 26. Reference numeral 29 is a casing for accommodating respective components.

In addition, reference numeral 27 is a unit affixed on a surface 28 of the semiconductor laser 21. This includes a high frequency superposition circuit therein.

A laser beam emitted from the semiconductor laser 21 is incident to the collimator lens 22, and is changed to a parallel beam. This parallel beam is then incident to the prism 23. A laser beam emitted from the semiconductor laser 21 is substantially elliptical in cross section. Accordingly, this laser beam is shaped by the prism 23 so that it is substantially circular in cross section.

A laser beam emitted from the prism 23 is incident to the mirror 25 through the beam splitter 24, and is reflected thereat. The reflected beam is incident to the objective lens 26. The objective lens 26 converges and irradiates the incident laser beam onto an optical disk (not shown).

A reflected beam from the optical disk is incident to the beam splitter 24 through the objective lens 26 and the mirror 25, and is reflected on the splitting plane 24a. The reflected beam is incident to a photodiode (not shown).

By driving the semiconductor laser 21 in correspondence with a recording signal, a laser beam emitted from the laser 21 is modulated in correspondence with the recording signal. Thus, information is recorded onto the optical disk.

The level of a reflected light beam from the optical disk changes in correspondence with a recording signal on the optical disk. Accordingly, a reproduced signal from the optical disk can be provided by an output from the photodiode.

The high output semiconductor laser 21 undergoes, at the time of reading signals (when its output is at low level), influence of a return beam noise, so the S-N ratio is apt to be deteriorated. In order to suppress the influence of this return beam noise, at the time of playback (at the time of low level), a high frequency component from a superposition circuit provided in the unit 27 is superimposed on a drive signal for the semiconductor laser 21.

As stated above, in the case of shaping a laser beam emitted from the semiconductor laser 21 by means of the prism 23, an optical axis 21A of a laser beam emitted from the semiconductor laser 21 and an optical axis 23A of a shaped laser beam form a predetermined angle. This angle is determined by an aspect ratio of a beam emitted from the semiconductor laser 21, a reflective index of the prism, and the like.

It is now assumed that the optical axis 23A is set perpendicular (or in parallel) to the transferring direction of the optical pickup device (radial direction of the optical disk), that one plane surface 29B of the casing 29 is arranged in parallel to the optical axis 23A, and that the outer plane surface 29A is arranged perpendicular to the optical axis 23A. In the case where no unit 27 is attached, the length in a direction perpendicular to the optical axis 23A is $L_{11}$, and the length (width) in a direction in parallel to the optical axis 23A is $W_{11}$.

On the contrary, in the case where the unit 27 of substantially rectangular parallelepiped is attached onto the plane 28 of the semiconductor laser 21 exposed from the casing 29, as indicated by broken lines in FIG. 6, this state is equivalent to the state where the plane surface 29A and 29B are moved so that they are in correspondence with the plane surface 30A and 30B, respectively. As a result, the length and the width of the casing become equal to $L_{12}$ and $W_{12}$, respectively. It is clear that the length $L_{12}$ and the width $W_{12}$ become larger than the length $L_{11}$ and the width $W_{11}$, respectively.

For the above reason, the optical pickup device, especially its drive unit is disadvantageously enlarged.

SUMMARY OF THE INVENTION

A principal object of the present invention is to provide an optical pickup device such that a quantity of extrusion in a transferring direction of the optical system movable unit of the optical system fixing unit is held down, thus permitting the opto-magnetic disk drive device to be compact.

An optical pickup device according to the present invention comprises a beam formation unit for forming a parallel beam by at least changing a laser beam from a light source to the parallel beam; a beam shaping unit for shaping a beam emitted from the parallel beam formation unit so that it is substantially circular; a beam splitter unit to which a beam emitted from the beam formation unit is incident; a light receiving unit to which a laser beam reflected on a splitting plane of the beam splitter unit is incident; and a polarized plane change unit provided at a predetermined position between the light source and the beam splitter unit for changing the plane of polarization of light passing through by a predetermined angle.

As one aspect of the present invention, the light source may be constituted by e.g., a semiconductor laser, and the beam formation unit may be constituted by e.g., a prism. These components are accommodated within a casing. The casing includes therein a high frequency superposition circuit for generating a high frequency superposition signal superimposed on a drive signal for the semiconductor laser, and is provided with a unit secured to the surface exposed from the casing of the semiconductor laser. The unit has a first plane surface secured to the semiconductor laser, a second plane surface substantially parallel to the optical axis of a laser beam emitted from the prism, and a third plane surface substantially perpendicular to the second surface.

At least the semiconductor laser and the prism are accommodated within the casing. A laser beam emitted from the semiconductor laser is shaped so that its cross section is substantially circular. The laser beam thus shaped is irradiated to a recording medium through, e.g., an objective lens.

When an output level of the semiconductor laser is low, for example, at the time of playback, or the like, that laser is driven by a drive signal on which a high frequency superposition signal is superimposed.

The first plane surface of the unit is secured to the semiconductor laser. At this time, the second and third plane surfaces are in parallel or vertical to a laser beam emitted from the prism. Accordingly, in the case where the optical pickup device is transferred in a direction parallel to the optical axis of a laser beam emitted from the prism, or in a direction perpendicular thereto, there is no possibility that the unit protrudes in a direction perpendicular to the transferring direction or in a direction parallel thereto.

Accordingly, a small sized optical pickup device can be realized.

As stated above, in accordance with an optical pickup device of the present invention, a unit including a high frequency superposition circuit for generating at least a high frequency superposition signal is provided. The unit has the first plane surface secured to the semiconductor laser, and the second and third plane surfaces in parallel or perpendicular to the optical axis of a laser beam emitted from the laser. Accordingly, in the case of transferring the optical pickup device in a direction parallel or perpendicular to the optical axis of a light beam emitted from the prism, there is no possibility that the unit protrudes in those directions, resulting in a more compact device.

BRIEF DESCRIPTION OF THE DRAWINGS

In the accompanying drawings:

FIGS. 12(a)–12-(c) are characteristic diagrams for explaining the operation of the circuit shown in FIG. 11.

DETAILED DESCRIPTION THE PREFERRED EMBODIMENTS

Preferred embodiments of an opto-magnetic disk recording/playback apparatus according to the present invention will now be described in detail with reference to the accompanying drawings.

Figure 7:
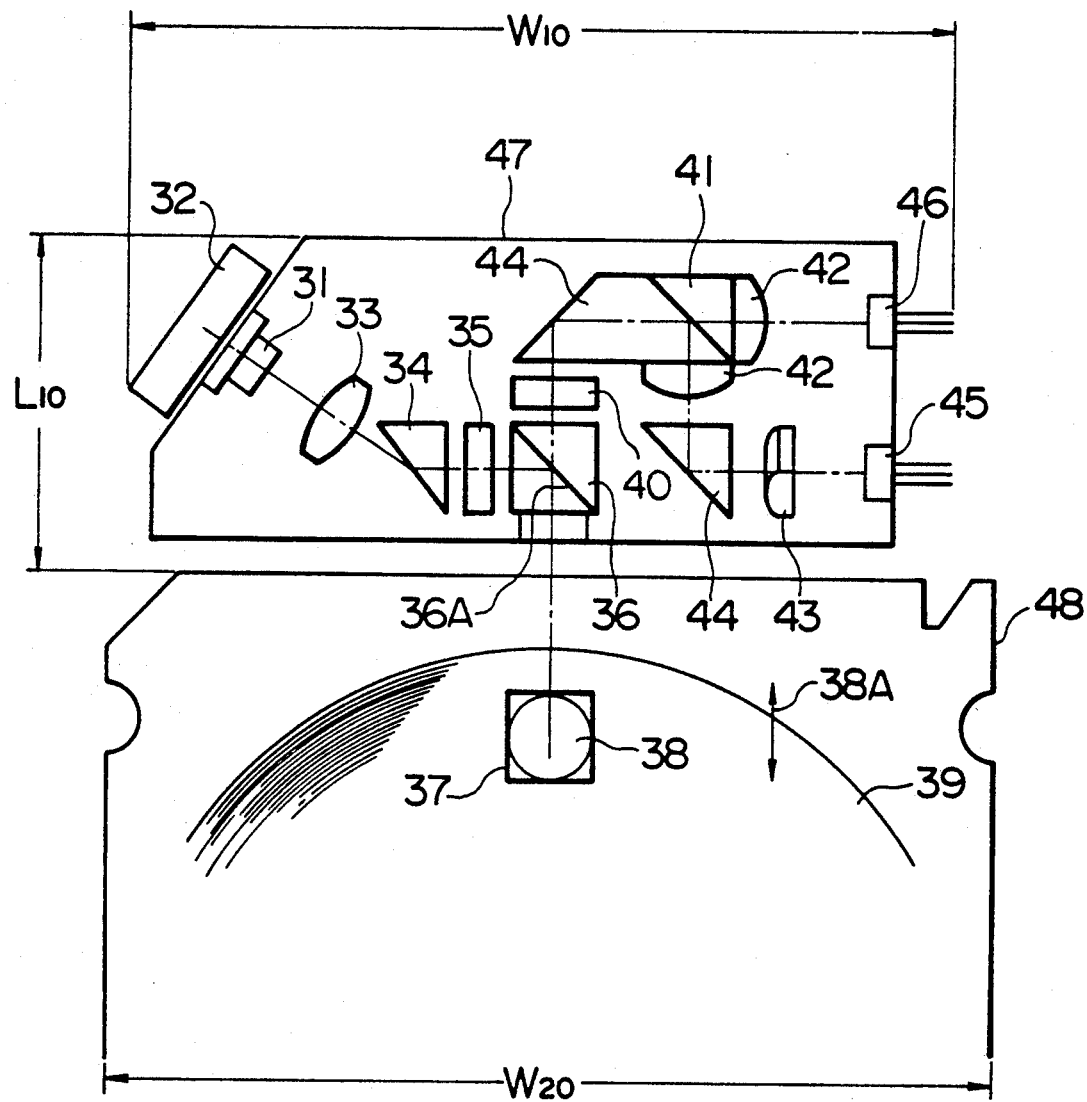
FIG. 7 is a plan view showing an arrangement of an optical pickup device for an opto-magnetic recording/playback apparatus according to a first embodiment of the present invention.

FIG. 7 shows a first embodiment of an optical pickup for an opto-magnetic disk apparatus according to the present invention. A laser beam emitted from a semiconductor laser 31 as a light source is, at the time of playback, subjected to high frequency modulation at a high frequency superposition circuit 32, and is changed to a parallel beam at a collimator lens 33 functioning as a parallel beam formation unit. The parallel beam thus obtained is incident to a beam shaping prism 34 functioning as a beam shaping unit. Since a laser beam emitted from the semiconductor laser 31 is substantially elliptical in cross section, it is shaped by the prism 34 so that its cross section is substantially circular. A laser beam emitted from the prism 34 being polarized in parallel to the plane of the drawing, is a P-polarized light with respect to a splitting plane 36A of a beam splitter 36 functioning as a beam splitter unit. The laser beam emitted from the prism 34 is caused to be incident to a half-wave plate 35. The crystal axis of the half-wave plate 35 is set so that the plane of polarization of an incident beam is rotated by 90 degrees. Thus, a laser beam incident to the beam splitter 36 becomes a linear polarized light having a plane of polarization perpendicular to the plane of the drawing. This polarized light serves as an S-polarized light with respect to the splitting plane 36A. Accordingly, the splitting ratio of the splitting plane 36A of the beam splitter 36 is set below in order to maximize the intensity of a reproduced signal. Namely, it is sufficient to make a setting such that the ratio between transmission factor Tp of P-polarized light and reflection factor Rp of P-polarized light is expressed as 100:0, and that the ratio between transmission factor Ts of S-polarized light and reflection factor Rs of S-polarized light is expressed as 67:33. Since this is a splitting ratio such that the reflection factor of S wave is higher than that of P-polarized light, a beam splitter to meet this condition can be sufficiently manufactured. A laser reflected on the splitting plane 36A is incident to a beam directing prism 37, and is reflected thereat in a direction perpendicular to the plane of the drawing. The reflected light thus obtained is incident to an objective lens 38. The objective lens 38 converges and irradiates the laser beam incident thereto onto an opto-magnetic disk 39. Furthermore, the objective lens 38 is transferred in a direction incident by an arrow 38A by a feed mechanism (not shown).

A reflected light from the opto-magnetic disk 39 is incident to the beam splitter 36 through the objective lens 38 and the beam directing prism 37. A signal component of the reflected light is transmitted through the splitting plane 36A of the beam splitter 36 and travels toward the signal detection optical system. In the signal detection optical system, there are arranged a second half-wave plate 40, a polarized light beam splitter 41, a convex lens 42, a cylindrical lens 43, and a total reflection prism 44 for changing the direction of an optical path. A laser beam transmitted through the cylindrical lens 43 is received by a quadrisected photo sensor 45. Thus, a tracking error, a focus error, and a playback signal are sensed. The playback RF signal sensed at either photo sensor 45 and 46 is amplified by a differential amplifier (not shown), and is then transmitted to a signal processing system (not shown).

In the first embodiment, explanation has been made in connection with the example where the half-wave plate 35 is inserted between the beam shaping lens 34 and the beam splitter 36. However, the present invention is not necessarily limited to this embodiment. For example, it is needless to say that such a half-wavelength plate may be provided between the semiconductor laser 31 and the collimator lens 33, or may be provided between the collimator lens 33 and the beam shaping prism 34.

The optical pickup of the first embodiment shown in FIG. 7 employs the optical system as described in detail. Thus, a quantity of protrusion $L_{10}$ from the cartridge 48 of the optical system fixing unit 47 in a direction of the transferring direction 38A of the optical system movable unit can be reduced a large extent. Furthermore, by making the width $W_{10}$ of the optical system fixing unit smaller than the width $W_{20}$ of the cartridge by suitably setting the focal length of the collimator lens 33 and the convex lens 42 or devising various mechanisms, the opto-magnetic disk playback apparatus can be small sized.

There will now be described in detail respective arrangements of the optical pickups, the drive mechanisms and the connection circuits therefor according to second and third embodiments of the present invention with reference to FIGS. 8 to 12.

Figure 8:
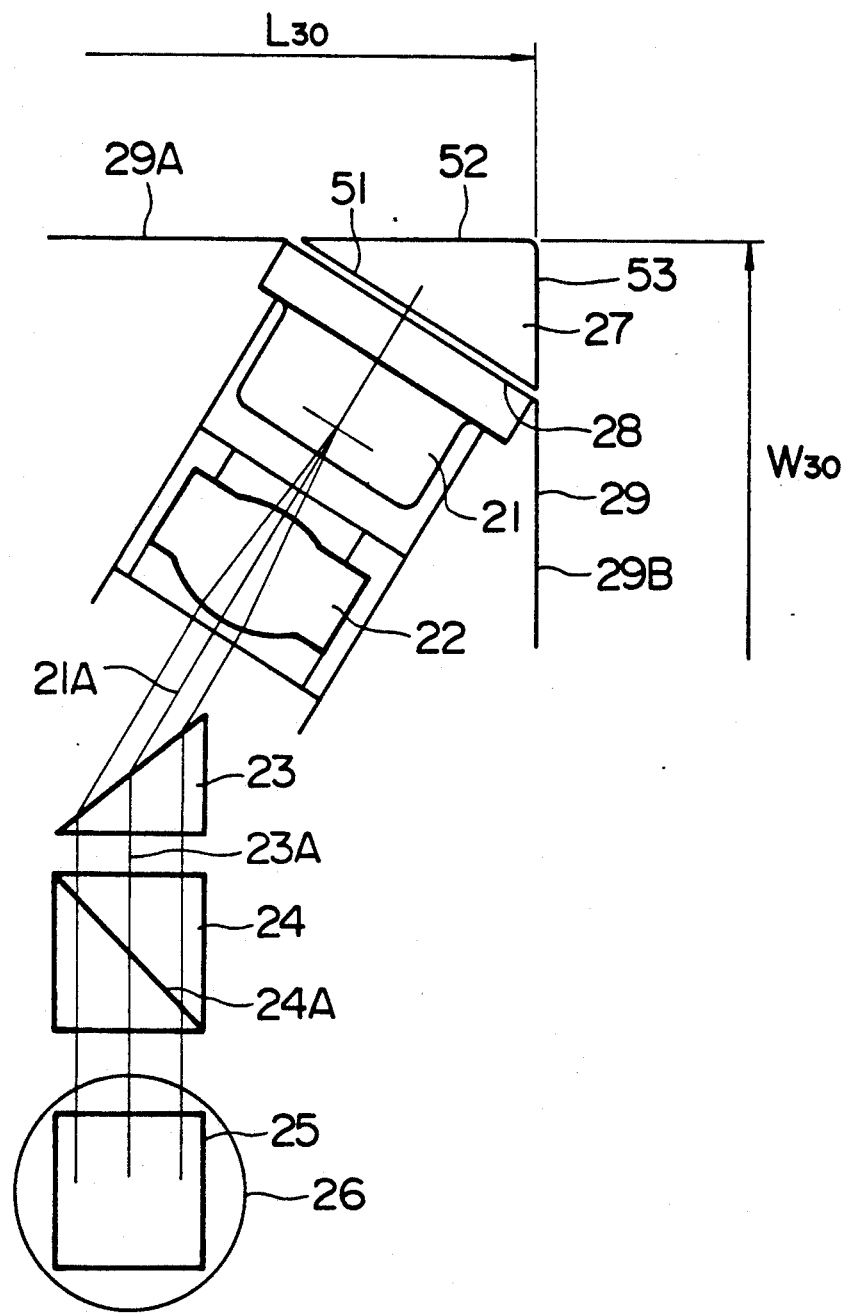
FIG. 8 is a plan view showing an arrangement of an optical pickup device according to a second embodiment of the present invention.

FIG. 8 shows the arrangement of the second embodiment of the optical pickup device according to the present invention. The same reference numerals are attached to portions corresponding to those in the case of FIG. 6 which has been described as the prior art, respectively, and, their detailed description is omitted to avoid repetition.

In FIG. 8, reference numeral 51 denotes a plane surface of the unit 27', which is secured to a plane surface 28 of the semiconductor laser 21 exposed from the casing 29. Accordingly, the plane surface 51 is substantially perpendicular to the optical axis 21A of a laser beam emitted from the semiconductor laser 21 in the state where the plane surface 51 is secured.

Reference numerals 52 and 53 denote other plane surfaces, respectively. The plane surface 52 is formed so that it is substantially perpendicular to the optical axis 23A of a laser beam emitted from the prism 23 when the plane surface 51 is secured to the plane surface 28. Furthermore, the plane surface 53 is formed so that it is in parallel to the optical axis 23A when the plane surface 51 is secured to the plane surface 28.

Figure 1:
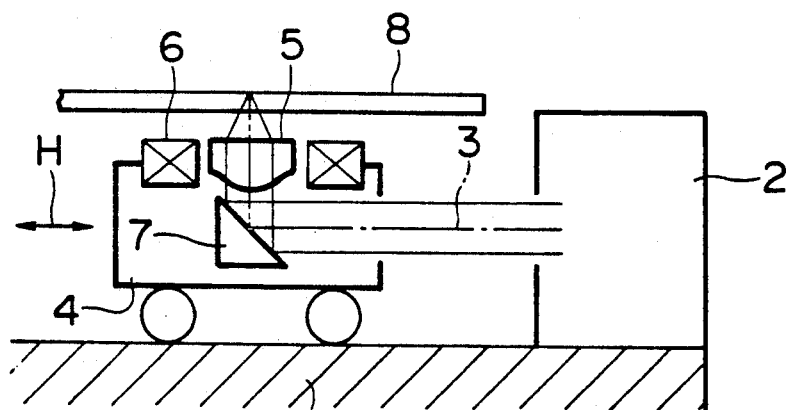
FIG. 1 is a schematic view showing an example of a conventional separation type optical system.
Figure 2:
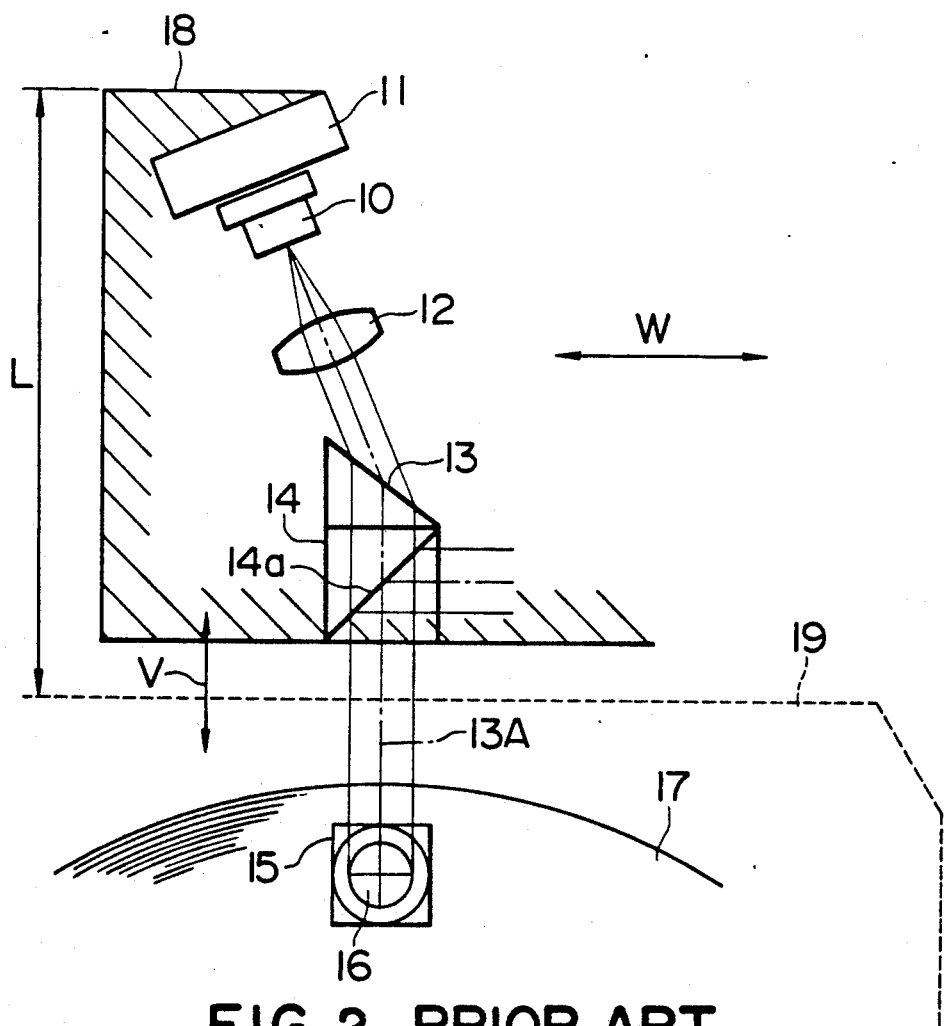
FIG. 2 is a plan view showing an arrangement of a conventional pickup device using the separation type optical system shown in FIG. 1.
Figure 3:
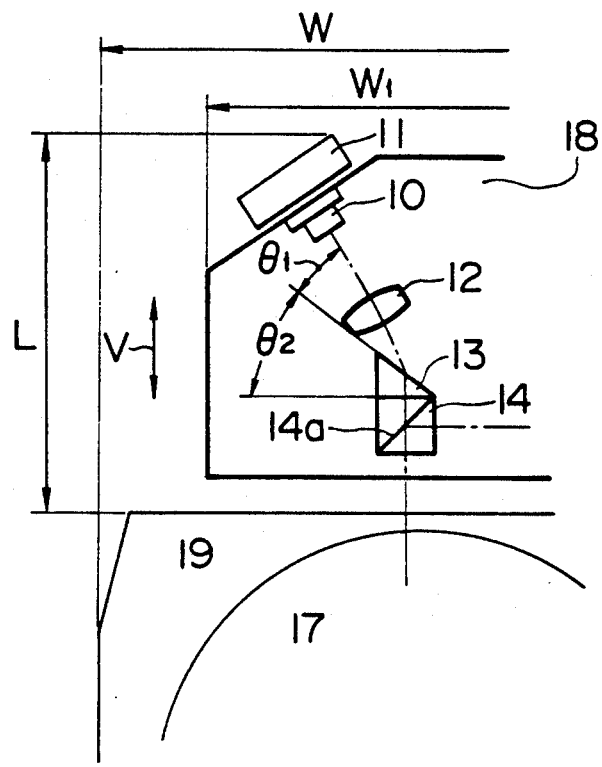
FIG. 3 is a plan view showing an example of a conventional optical fixing unit having substantially the same arrangement of that of FIG. 2.
Figure 4:
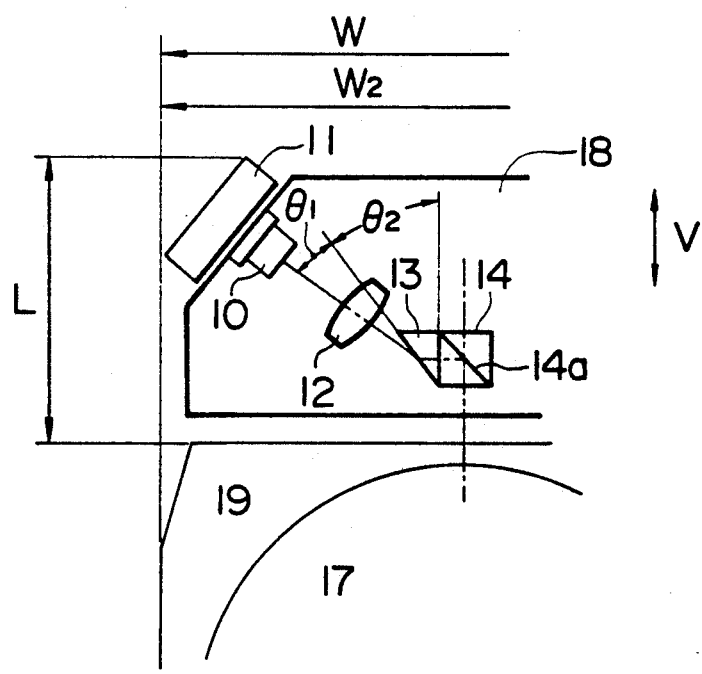
FIG. 4 is a plan view showing another example of a conventional optical system fixing unit of a structure such that a laser emitted beam is incident from a direction perpendicular to that of FIG. 3.
Figure 5:
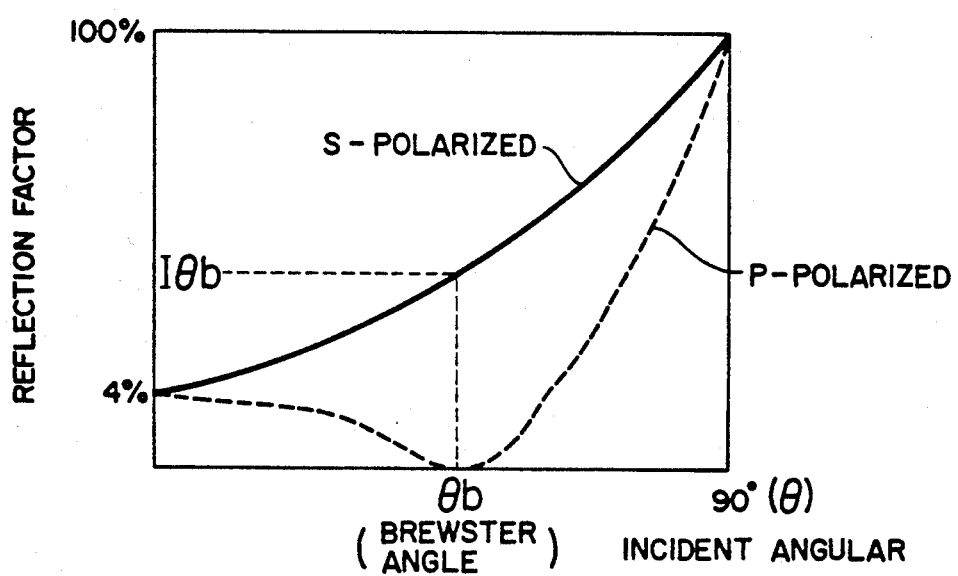
FIG. 5 is a characteristic diagram showing the relationship between an incident angle and a reflection factor of a laser beam in the conventional devices shown in FIGS. 1 to 4.
Figure 6:
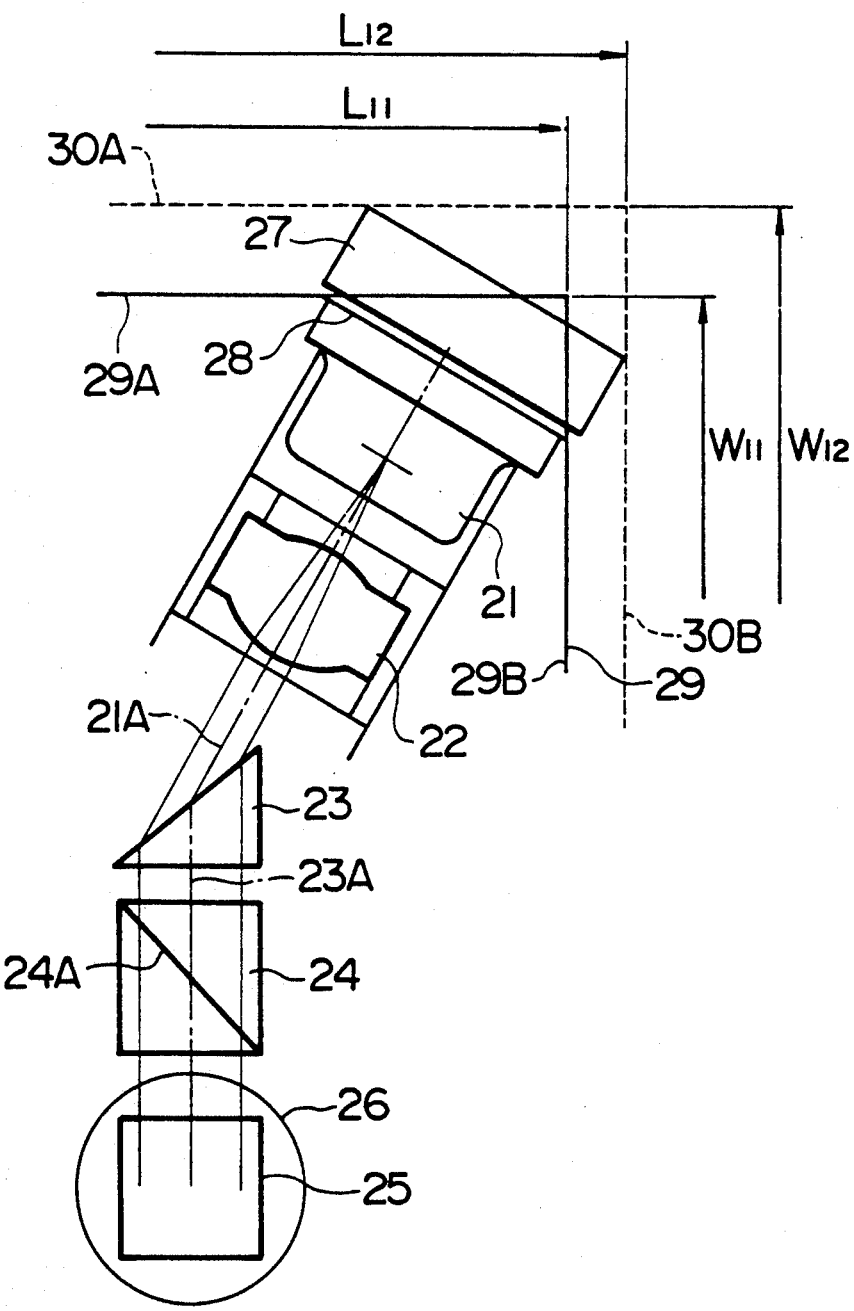
FIG. 6 is a plan view showing a still further arrangement of a conventional optical pickup.

Other components are the same as in the case of FIG. 6.

As is clear from FIG. 8, since the plane surfaces 52 and 53 of the unit 27 are substantially in parallel to the plane surfaces 29A and 29B of the casing 29, respectively, the length $L_{30}$ and the width $W_{30}$ of the casing 29 can be the same as those when no unit 27 is secured, respectively.

Figure 9:
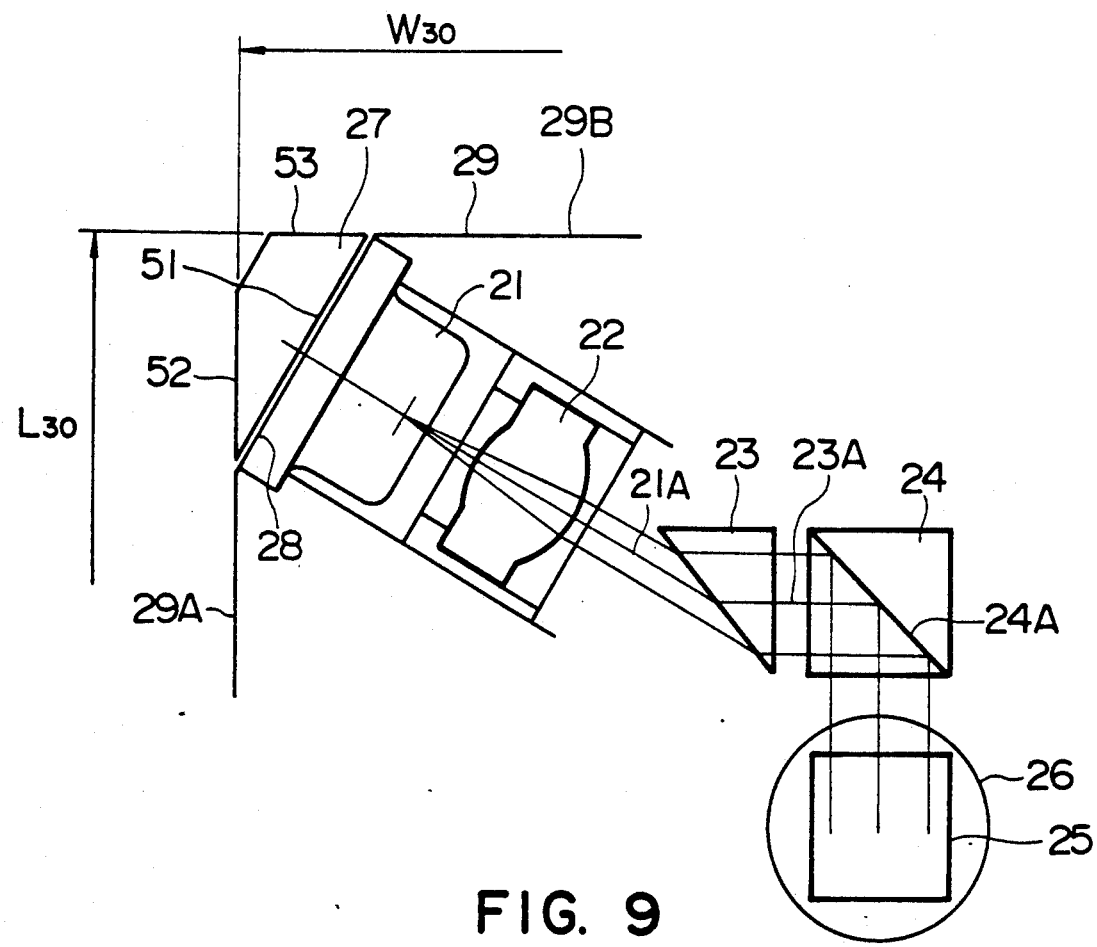
FIG. 9 is a plan view showing an arrangement of an optical pickup device according to a third embodiment of the present invention.

FIG. 9 shows the arrangement according to the third embodiment of the present invention. The same reference numerals are attached to portions corresponding to those in the case of FIG. 8, respectively.

In the third embodiment, a laser beam emitted from the prism 23 is reflected on the splitting plane 24A of the beam splitter 24, and is then incident to the mirror 25 and the objective lens 26. Furthermore, a reflected beam from an optical disk (not shown) is incident to the beam splitter 24 through the objective lens 26 and the mirror 25. The incident beam thus obtained is transmitted through the splitting plane 24A, and is then incident to the photo diode.

Figure 10:
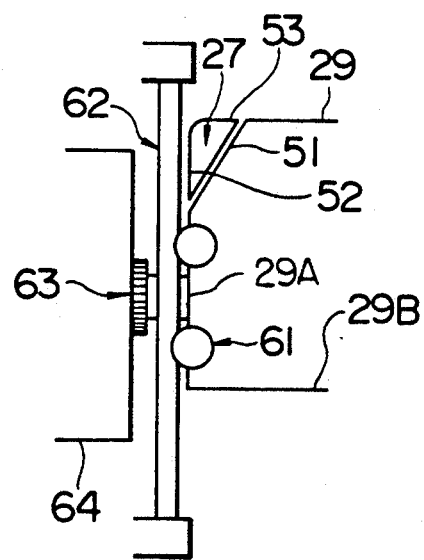
FIG. 10 is a plan view showing an example of a drive mechanism of the optical pickup device according to the present invention.

FIG. 10 shows the arrangement of a drive mechanism for transferring such optical pickup devices in a radial direction of the optical disk.

In this figure, reference numeral 61 denotes a roller rotatably secured on the casing 29. This roller 61 rotationally moves on a shaft 62. Reference numeral 60 denotes a coil secured to the casing 29, and reference numeral 64 denotes a yoke for producing a magnetic field applied to the coil 63. By the coil 63 and the yoke 64, a linear motor is formed.

When a predetermined drive signal is delivered to the coil 63 arranged in a magnetic field produced by the yoke 64, an electromagnetic force is produced in the coil 63. Since the coil 63 is secured to the casing 29, the roller 61 rotationally moves on the shaft 62. As a result, the casing 29 is transferred in a radial direction of the optical disk (in upper and lower directions in the figure) perpendicular (or in parallel) to the direction of the optical axis 23A of a beam emitted from the prism 23.

As previously described, since the unit 27 is formed so that its plane surface 52 is in parallel to the transferring direction, the unit 27 can be arranged in a manner to be sufficiently close to the shaft 62. Furthermore, since the plane surface 53 is perpendicular to surface 29B the unit 27 protrudes in the transferring direction. Thus, the drive mechanism can be small-sized.

Figure 11:
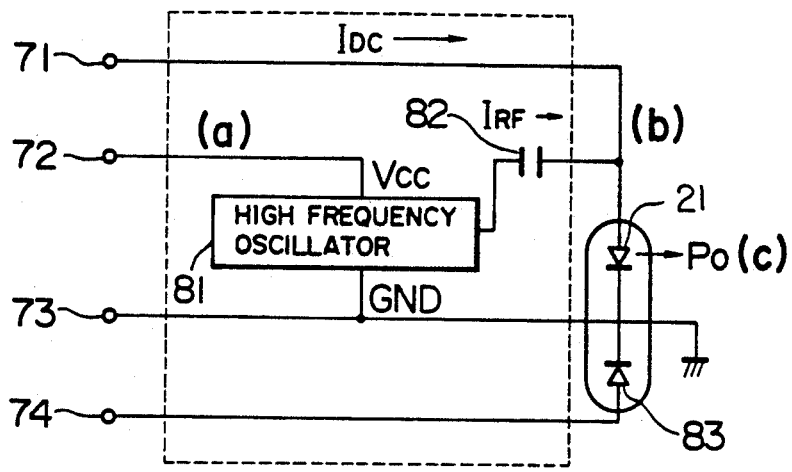
FIG. 11 is a circuit diagram showing an example of the connection relationship between the unit and the semiconductor laser in the optical pickup device according to the present invention.

FIG. 11 is a circuit diagram showing an electrical connection relationship between the semiconductor laser 21 and the unit 27.

In this figure, reference numerals 71 to 74 denote terminals, respectively. A predetermined signal is inputted to each terminal and is output therefrom. Reference numeral 81 denotes a high frequency oscillator which produces a high frequency superposition signal. Reference numeral 82 denotes a capacitor. The high frequency superposition signal produced is outputted to the semiconductor laser 21 through the capacitor 82. Reference numeral 83 denotes a photodiode for a monitor, which receives a laser beam emitted to the side opposite to the collimator lens 22.

The high frequency superposition circuit including the high frequency oscillator 81 and the capacitor 82, and the photodiode 83 is accommodated within the unit 27.

Figure 12:
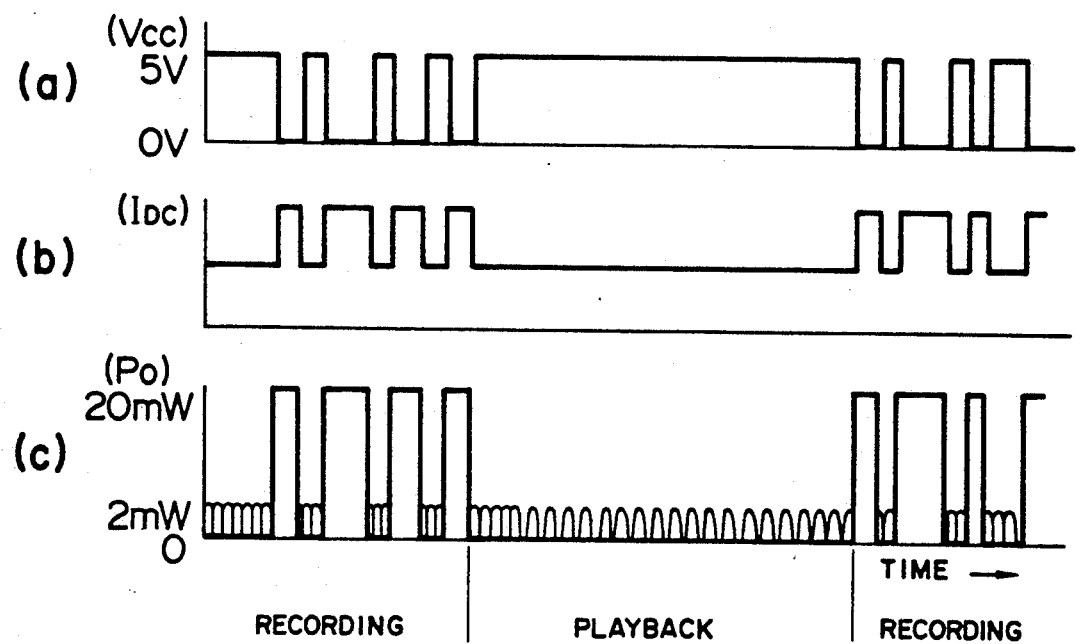

The operation thereof will be described with reference to the timing chart of FIG. 12.

At the time of recording a signal, a drive current (current b shown in FIG. 12(b)) corresponding to a recording signal is inputted from the terminal 71 and is delivered to the semiconductor laser 21. Thus, an output $P_o$ (signal c of FIG. 12(c)) of the semiconductor laser 21 changes in correspondence with the recording signal.

The laser beam is converged and irradiated from the collimator lens 22 onto the optical disk through the optical system of the objective lens 26. When the output of the semiconductor laser 21 is at high level, data are recorded onto the optical disk.

Furthermore, a laser beam emitted from the side opposite to that of the collimator lens 22 of the semiconductor laser 21 is received by a photodiode 83. An output from the photodiode 83 is delivered from the terminal 74 to a circuit (not shown). Ordinarily, by making use of this signal, an automatic control (APC control) is conducted so that the level of a laser beam emitted from the semiconductor laser 21 becomes equal to a predetermined value.

On the other hand, a superposition control signal (signal a in FIG. 12(a)) is input from the terminal 72. When this superposition control signal is at high level, the high frequency oscillator 81 initiates an oscillation. A high frequency superposition signal produced by the high frequency oscillator 81 is superimposed on a drive signal from the terminal 71 through the capacitor 82. The level at the time of playback of the drive signal corresponds to a low level (level for a period during which no signal is recorded) of the drive signal at the time of recording.

As stated above, when the drive signal is at low level, a high frequency superposition signal is delivered to the semiconductor laser 21. Thus, the output (signal c in FIG. 12(c)) of the semiconductor laser 21 is turned on or off in correspondence with the high frequency superposition signal.

By the above-mentioned operation, the influence of return beam noise can be reduced.

What is claimed is:

1. An optical pickup device for an optical recording/playback apparatus including a recording disk and an optical system unit movable in a radial direction of the recording disk, comprising:

light emitting means for producing a light for recording information onto the recording disk and playing back the information from the recording disk, the light emitted having an elliptical cross section;

parallel light generating means for changing the light from said light emitting means to a parallel light;

beam shaping means for enlarging the diameter of the emitted light in the direction of the short axis thereof for shaping the parallel light into a substantially circular shape in cross section and directed perpendicular to the radial direction of the recording disk;

beam splitter means for dividing the circular beam from said beam shaping means in the radial direction of the recording disk;

light beam receiving means provided on the optical system unit for receiving a divided beam reflected on a splitting plane of said beam splitter means in the radial direction of the recording disk; and polarized plane change means provided at a predetermined position between said light emitting means and said beam splitter means, for changing a plane of polarization of light so that the polarized light is reflected by the beam splitter means in the radial direction of the recording disk.

2. An optical pickup device as claimed in claim 1, wherein: said light emitting means comprises a semiconductor laser.

3. An optical pickup device as claimed in claim 1, wherein: said parallel light generating means comprises a collimator lens.

4. An optical pickup device as claimed in claim 1, wherein:

said beam shaping means comprises a beam shaping prism for shaping a light emitted from said parallel light generating means so that the light is substantially circular and perpendicular to the radial direction of the recording disk.

5. An optical pickup device as claimed in claim 1, wherein: said light beam receiving means comprises a beam directing prism to which a parallel circular beam reflected on said splitting plane of said beam splitter means is incident, and an objective lens to which a light emitted from said beam directing prism is incident.

6. An optical pickup device as claimed in claim 1, wherein: said polarized plane change means comprises a half-wave plate for rotating said plane of polarization by 90 degrees.

7. An optical pickup for an optical recording/reproducing apparatus comprising:

light emitting means for producing a light beam for recording information onto a recording medium and reproducing the information from the medium;

a back plane on said light emitting means;

parallel beam generating means for changing the light beam from said light emitting means to a parallel light beam;

beam shaping means comprising at least one prism for shaping said parallel light beam into a light beam with a circular profile; and a casing for accommodating therein said light emitting means, said parallel beam generating means, said beam shaping means, and a unit including therein a high frequency superposition circuit disposed adjacent to said back plane of said light emitting means for generating a high frequency superposition signal superimposed on a drive signal for said light emitting means, said unit being secured to a plane surface exposed from said casing of said light emitting means; said unit further comprising a first plane surface secured to said light emitting means substantially parallel to said plane surface thereof, a second plane surface substantially in parallel to the optical axis of a parallel circular beam emitted from said beam shaping means, and a third plane surface substantially perpendicular to said second plane surface so that said unit does not protrude from an area sandwiched between a perpendicular outermost line of a fixed portion of the optical apparatus perpendicular to the direction of movement of a movable portion and a parallel outermost line parallel to said direction of movement.

* * * * *